United States Patent [19]
Kloefkorn

[11] 3,874,471
[45] Apr. 1, 1975

[54] FUEL FEEDING SYSTEM FOR A VEHICLE

[76] Inventor: Earl W. Kloefkorn, Manchester, Okla. 73758

[22] Filed: Dec. 16, 1969

[21] Appl. No.: 885,464

[52] U.S. Cl. ............... 180/54 R, 123/136, 137/209, 137/565, 137/588, 220/44 R
[51] Int. Cl. ............................................ B60k 15/02
[58] Field of Search............ 180/1, 54 R; 280/5 A; 123/136; 220/44 R; 137/588, 572, 565, 209, 206

[56] References Cited
UNITED STATES PATENTS

| | | | |
|---|---|---|---|
| 1,088,854 | 3/1914 | Wadsworth | 123/136 X |
| 2,561,238 | 7/1951 | Smit | 137/209 X |
| 2,596,070 | 5/1952 | Friend et al. | 220/44 |
| 2,679,946 | 6/1954 | Friend | 220/44 X |
| 2,891,606 | 6/1959 | Horton | 137/209 |
| 2,997,102 | 8/1961 | Stearns | 137/588 X |
| 3,391,679 | 7/1968 | Williams et al. | 123/136 |

Primary Examiner—David Schonberg
Assistant Examiner—Milton L. Smith

[57] ABSTRACT

A fuel feeding system for a vehicle wherein a conventional spare tire and wheel assembly is used as an accumulator, supply tank and/or reservoir for a pneumatic pressure fluid, such as air, to supply liquid fuel from a tank to an engine, preferably in a wheeled vehicle; and novel means are provided for ducting vapors to the engine and preventing the same from escaping from the tank and polluting the atmosphere.

9 Claims, 6 Drawing Figures

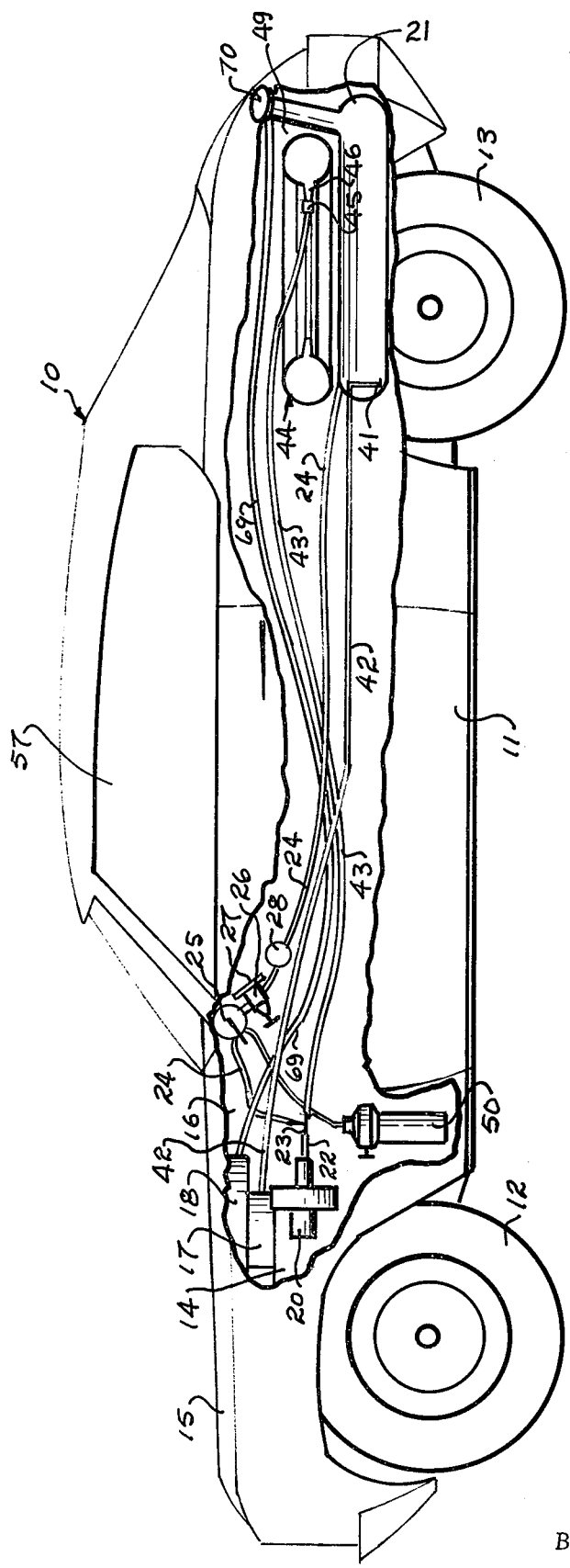

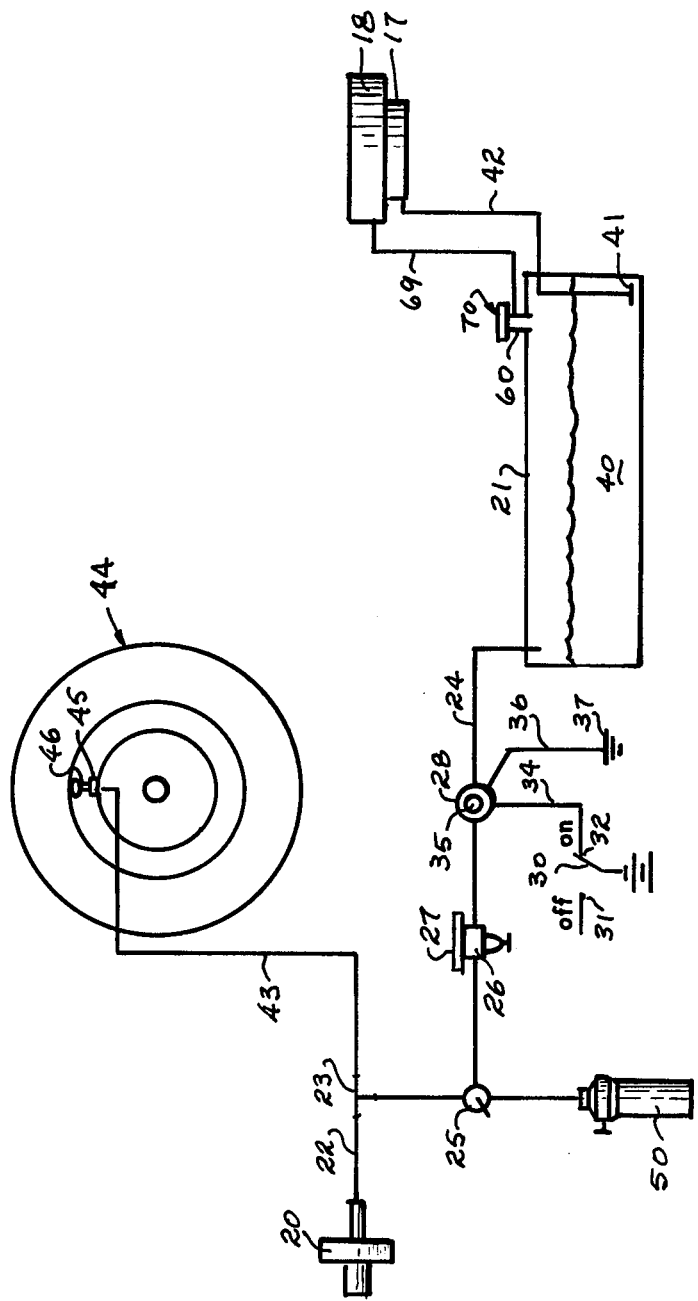

INVENTOR.
EARL W. KLOEFKORN

FUEL FEEDING SYSTEM FOR A VEHICLE

BACKGROUND OF THE INVENTION

This invention relates to fuel feeding systems. More particularly, this invention relates to fuel feeding systems for engines useful for propelling wheeled vehicles.

Heretofore, wheeled vehicles such as automobiles have depended upon fuel pumps for feeding liquid fuel such as gasoline to gasoline burning internal combustion engines. At the same time, the fuel tank of the automobile was vented to the atmosphere usually via the gas cap to permit atmospheric air to flow into the tank to replace the space occupied by the gasoline being consumed by the engine, or pumped from the tank. A disadvantage of the vented gasoline tank was that vaporized gasoline added to the air pollution problem. Also the vaporized gasoline represented the richest portion of the gasoline, and this portion was being lost to the atmosphere. These losses added up to vast energy resources being lost forever with resultant economic losses to this country, which depends upon oil imports to keep millions of vehicles in operation.

This invention overcomes and solves the above stated problems by the use of a spare tire and wheel assembly of a wheeled vehicle as an air storage tank. The use of the spare tire in this manner eliminates the need for any conventional air storage tank on the vehicle, and more especially eliminates the problem of finding a place to mount the air storage tank on the vehicle for use in the novel fuel feeding system herein disclosed. This is because most wheeled vehicles, such as passenger cars, etc., carry at least one spare tire and wheel assembly usually in the trunk. Whether the spare tire and wheel assembly is in the trunk or elsewhere, it is readily available for use as a pressure fluid accumulator or air storage tank in the fluid pressure system used to make the fuel feeding system operate. The novel fuel feeding system of this invention not only eliminates the venting of fuel vapors to the atmosphere but ducts the vapors into the engine for driving the same. This invention through the use of a pneumatic pressure fluid, such as air, forces the liquid fuel from the tank into the engine and thus eliminates the usual fuel pump and the vapor lock problems that may attach to the same.

SUMMARY OF THE INVENTION

One of the objects of this invention is the provision of a novel fuel feeding system preferably for wheeled vehicles.

Another object of this invention is the provision of a novel fuel feeding system comprising fluid pressure means for forcing liquid fuel and/or ducting fuel vapors to an engine.

Another object of this invention is the provision of a novel fuel feeding system for supplying liquid fuel to an engine and which also ducts fuel vapors to the engine and prevents the escape of vapors from the fuel tank into the atmosphere and polluting the same.

Yet another object of this invention is the provision of a novel fuel feeding system wherein compressed pneumatic fluid forces liquid fuel from a tank into the fuel injector system of the engine, such as the carburetor or fuel injectors, and any vapors of the fuel are ducted into the air intake system of the engine, such as the air cleaner, air intake, and/or intake manifolds.

A further object of this invention is the provision of a fuel feeding system as set forth in the preceding objects wherein compressed pneumatic fluid is supplied by an air compressor driven by the engine or by electrical means, spare tire and wheel assembly means functioning as a fluid pressure accumulator, and/or emergency cylinder means containing a compressed penumatic fluid, such as propane or an aerosol, that will support and not suppress combustion of the fuel with oxygen of the atmospheric air.

A still further object of this invention is the provision of a novel fuel feeding system comprising the use of a compressed pneumatic fluid from one or more of the sources set forth in the preceding object and more particularly the air compressor, the spare tire and wheel assembly serving as an accumulator, and/or the emergency cylinder, to force liquid fuel from a fuel tank to an engine, the flow of compressed pneumatic fluid being controlled by a two-way valve which selects whether the fluid is from the air compressor and spare tire and wheel assembly or the emergency cylinder, pressure regulator means, and/or an electrically operated solenoid valve preferably controlled by an ignition switch key.

Yet another object of this invention is the provision of a novel fuel feeding system comprising a compressed pneumatic fluid controlled as to its pressure for forcing liquid fuel from a tank to an engine, the flow of compressed pneumatic fluid being cut off when the ignition of the engine is switched off.

Another object of this invention is the provision of novel means for venting a fuel tank for a vaporizable liquid back to an engine for consumption and preventing the tank from being vented to the atmosphere.

A further object of this invention is the provision of a novel means for venting a liquid fuel tank as set forth in the preceding object wherein the tank is vented through a filler cap having vacuum valve means and/or pressure valve means for controlling the ingestion and outflow of vapors and/or pressure fluid, respectively.

In summary, this invention comprises a novel fuel feeding system for engines mounted on wheeled vehicles. The fuel feeding system comprises an air compressor preferably driven by an engine and connected to a liquid fuel tank for forcing fuel therefrom to the engine. The air compressor is also connected to spare tire and wheel assembly means for use of the same as an accumulator, which stores excess compressed air that can be used when the air compressor is not in operation.

In the event that both the air compressor and the accumulator are not supplying compressed air to the liquid fuel tank, an emergency cylinder of an aerosol, propane, or the like, is provided for supplying a pressure fluid to the liquid fuel tank. A two-way valve is provided to shut off the connection of the air compressor and the air accumulator to the liquid fuel tank when the emergency cylinder is put into operation.

A pressure regulator is provided to regulate the flow of the pressure fluid to the liquid fuel tank. It is also preferred that a solenoid-operated valve controlled by the engine ignition switch be used to shut off the flow of pressure fluid to the fuel tank when the ignition is turned off, and to open the flow of the pressure fluid to the liquid fuel tank when the ignition switch is turned on.

Another feature of this invention is the provision of a pressure-vacuum gas cap for the liquid fuel tank that is not vented to the atmosphere at the fuel tank. This reduces air pollution and conserves the rich vapors of the fuel for use in the engine. This is accomplished by ducting vapors from the gas cap back to the engine's air induction system, and preferably into the air cleaner and/or the engine intake manifold. The gas cap is provided with a vacuum valve for relieving any vacuum created in the liquid fuel tank by infiltrating the tank with vapors and/or air from the engine's air intake system, and/or manifold. On the other hand, the gas cap is provided with a pressure valve to relieve excess fluid pressure and vapors in the fuel tank and feeds the same to the engine for consumption by the engine.

The invention further resides in certain novel features of construction, combinations, and arrangements of parts and further objects and advantages of the invention will be apparent to those skilled in the art to which it pertains from the following description of the present preferred embodiments thereof described with reference to the accompanying drawings, which form a part of this specification, wherein the same reference numerals indicate corresponding parts throughout the several views, and in which:

FIG. 1 is a side elevational view of a wheeled vehicle embodying the invention, but with parts broken away and in section to show details of the invention;

FIG. 2 is a schematic electro-mechanical diagram of the invention shown in FIG. 1;

Figure 4:
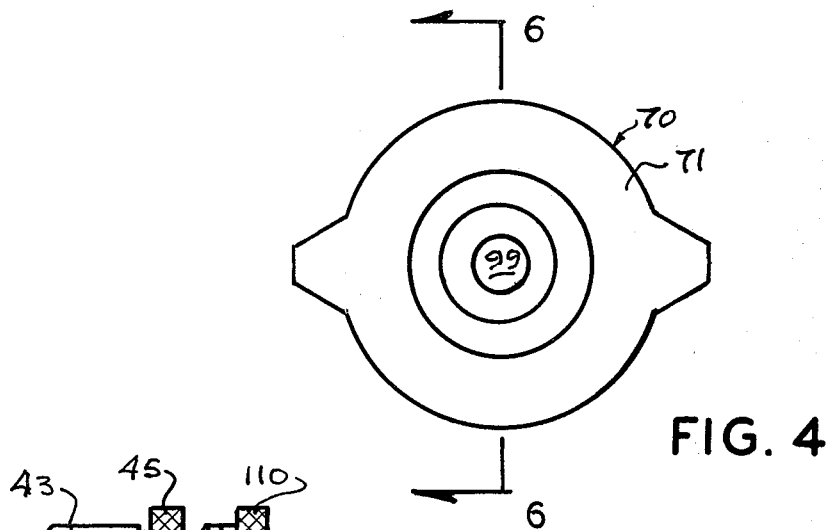
FIG. 4 is a top plan view of a gas cap shown in FIG. 1.

It is to be understood that the invention is not limited to the details of construction and arrangements of parts shown in the drawings and hereinafter described in detail, but is capable of being otherwise embodied and of being practiced and carried out in various ways. It is to be further understood that the terminology employed herein is for the purpose of description and there is no intention to limit the invention beyond the requirements of the prior art.

Referring to FIG. 1, the reference numeral 10 indicates generally a wheeled vehicle embodying the invention. The vehicle 10, more particularly, is an automobile. The vehicle 10 comprises a body 11, mounted on front wheel means 12 and rear wheel means 13. The front wheel means 12 are manually controlled by a conventional steering mechanism, not shown. The vehicle 10 has an engine 14 under a hood 15 in a compartment 16. The engine 14 is preferably a gasoline fueled internal combustion engine. The engine 14 drives the rear wheel means 13 by a conventional drive mechanism, not shown.

The engine 14 has a carburetor and intake manifold means 17. An air cleaner 18 is mounted atop of the carburetor and intake manifold means 17 in a conventional manner. The engine 14 drives a conventional air compressor 20 located under the hood 15. However, it will be understood that the air compressor 20 can be driven by other motor means, such as an electric motor powered either from generator means, or battery means, and can be located in any desired or suitable part of the vehicle 10.

The air compressor 20 supplies compressed air to a liquid fuel tank 21 via a discharge line 22, a T-connection fitting 23, and a fluid pressure supply line 24. The supply line 24 has a manually operated two-way valve 25, a manually operated pressure control or regulator valve 26 with a pressure indicator gauge 27, and an ignition switch operated solenoid valve 28 therein. As shown in FIG. 2, an ignition key operated switch 30 is moved from an "off" position 31 to an "on" position 32 for connecting a battery 33 via a conductor 34 to a solenoid 35 of the sclenoid operated valve 28. The solenoid 35 is connected via a conductor 36 to a ground 37. The ground 37 is preferably at a ferrous portion of the vehicle 10, such as an engine 14.

The compressed air in the fuel tank 21 forces liquid fuel, such as gasoline, indicated by the reference numeral 40 into an inductor 41 and feeds fuel to the carburetor and manifold means 17 of the vehicle 10 via a fuel feed line 42.

The air compressor 20 also supplies compressed air via the discharge line 22, the T-connection fitting 23, and a conduit 43 to a spare tire and wheel assembly indicated generally by the reference numeral 44. Preferably, the conduit 43 terminates in an internally threaded screw cap 45 that is threaded onto a conventional valve stem 46, FIGS. 1 and 3. The spare tire and wheel assembly means 44 function as an accumulator, supply tank, and/or reservoir, and is located in its usual place in the vehicle 10. In this instance the spare tire and wheel assembly means 44 are located in a trunk compartment 49 of the vehicle 10.

While the spare tire and wheel assembly means 44 provide a supply of pressure fluid during start-up of the vehicle 10, the air compressor 20 provides the normal supply of pressure fluid to the fuel tank 21 while the engine 14 of the vehicle 10 is in operation. However, in the event of a failure of the compressed air system, an emergency bottle or cylinder 50 of pneumatic pressure fluid is provided for use by merely manually adjusting the two-way valve 25. If the air compressor 20 were electrically driven, it is possible that the emergency cylinder 50 may not be needed or desired since the electrical supply may be derived independently of the engine 14.

Preferably, the two-way valve 25, the pressure regulator valve 26, the solenoid-operated valve 28, and the key-operated switch 30 for the valve 28 are located in or on a dash panel, not shown, in a passenger compartment 51 of the vehicle 10. The pressure regulator 26 regulates the pressure in the fuel tank 21 and therefore regulates the maximum rate of flow of the liquid fuel 40 to the engine 14. It will be understood that the provision of the novel fuel feeding system described herein eliminates the need for a conventional fuel pump, and/or a fuel tank vent means for admitting atmospheric air into the fuel tank to replace the fuel being taken from the tank 21.

The air or other pneumatic fluid entering the liquid fuel tank 21 by the line 24 exerts pressure on the fuel 40, as controlled by the pressure regulator 26, and forces the fuel 40 to the carburetor and intake manifold means 17. In the event that a carburetor system is not in use on the engine, the fuel 40 would be fed to a fuel injector system instead.

A filler neck or spout 60 is preferably equipped with a filler cap, indicated generally by the reference numeral 70. The filler cap 70 is preferably a pressure-vacuum cap provided with a fuel vapor vent system that pipes the vapor back to the air intake and/or cleaner means 18 of the engine 14 via a conduit 69 so that excess vapor is pulled through the combustion chambers of the engine 14. Alternatively, the vented vapors may be piped back and inducted into the carburetor and intake manifold means 17 of the engine 14, along with the charge of atmospheric air to be carbureted by the liquid fuel in the carburetor.

As an alternative embodiment of the invention, in lieu of the pressure-vacuum cap 70, a manually controlled vent cap in combination with a safety relief valve may be used to prevent too much pressure in the tank 21 in case of a failure of the pressure regulator valve 26. The filler cap 70 does not have a safety relief valve system as such, but preferably does vent excess fuel vapors or fumes to the air cleaner means 18. When the engine 14 is not in operation, the problem of controlling the flow of fuel and any vapors thereof to the engine 14 is largely solved by the use of the electrically operated solenoid valve 28 that is opened only when the ignition switch 30 has been moved to the on position, and the solenoid valve 28 is closed when the switch 30 is moved to the off position. The switch 30 is moved to the on and off positions through the use of a conventional ignition key in a manner well known in the art.

The presence of the solenoid operated valve 28 also helps solve the contemporary problem of an engine "dieseling" after the ignition switch of a high compression engine has been turned off, since fuel to the engine 14 is instantly stopped, by the closure of the valve 28. Once the supply of fuel in the fuel line 42 and in the carburetor and intake manifold means 17 has been consumed, the engine 14 must stop running due to fuel starvation.

Figure 6:
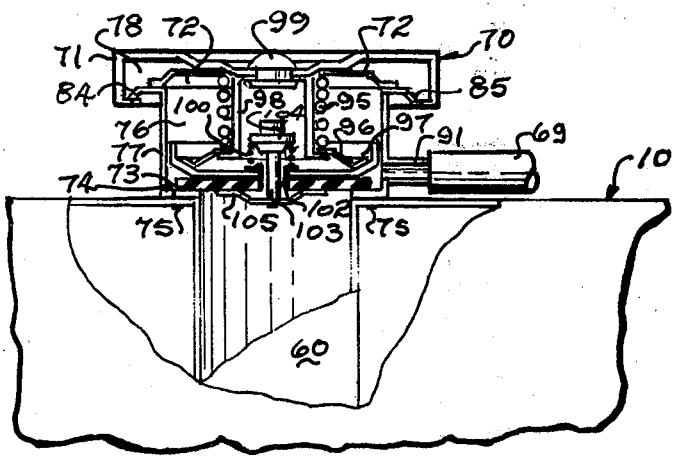
FIG. 6 is a cross-sectional view of the gas cap and fuel tank taken along section line 6—6 of FIG. 4.
Figure 5:
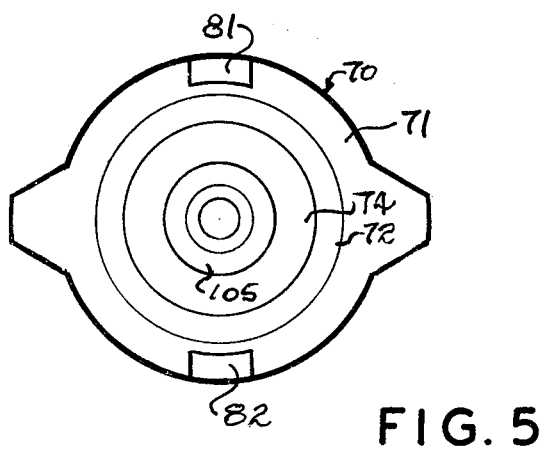
FIG. 5 is a bottom view of the gas cap shown in FIG. 4.

The operation of the filler cap 70 is such that the engine 14 cannot operate on vapors alone from the fuel tank 21 once the solenoid valve 28 has been closed. The filler cap 70 will now be described. Referring to FIGS. 4, 5, and 6, the filler cap 70 comprises an inverted cup-shaped cap 71 having a flexible, dishable pressure release valve disc 72 and a rubber or elastomeric pressure valve disc or washer 73. When a positive pressure is built up in the fuel tank 21, the flexible rubber disc 73 is flexed, dished or urged upwardly off of an horizontal annular seat or flange 74. The flange 74 is fixed to an upper shoulder or surface of the filler spout 60, such as by spot welds or rivets at 75. The filler spout 60 forms a part of the fuel tank 21. Vapor then flows into a cylindrical or tubular chamber 76, which is formed by a cylindrical wall 77 integrally connected to the flange 74. The vapor, when sufficient pressure is built up in the chamber 76, will cause the pressure seal 72 to flex and dish upwardly and release vapor into a cylindrical chamber 78 of the cap portion 71 and to the atmosphere. It will be noted that this only occurs if the fluid pressure in the chamber 76 cannot be adequately relieved through the tube or conduit 69.

The cap portion 71 has two diametrically opposed and radially inwardly extending planar cam engaging ears 81 and 82 adapted to cam under and tightly engage an annular flange 83 having camming ramps 84 and 84, respectively, of the filler spout 60. The flange 83 of the filler spout 60 is provided with two diametrically opposed bayonet slots, not shown, to accommodate the introduction of the cam engaging ears 81 and 82 beneath the flange 83. The cap portion 71 is tightened by manually turning the same in a clockwise direction, FIG. 4.

Normally the fuel vapors are ducted to the engine 14 by way of the vapor exhaust conduit or tube 69. The tube 69, FIG. 6, is connected to an exhaust port defined by an horizontal, laterally extending tube segment 91 affixed into the wall 77 defining the chamber 76.

It will be understood that when there is a positive pressure in the fuel tank 21 of sufficient magnitude to overpower and compress a pressure valve spring 95 and lift up the washer 73, only then will there be fuel vapors ducted to the engine 14 via the conduits 91 and 69. The valve disc 72 will only on rare occasions permit vapor to be ducted to the atmosphere thereat. If desired, the valve disc 72 can be made so stiff that it may never flex or dish as described hereinabove.

The pressure valve spring 95 is an helical compression spring. The pressure valve spring 95 is seated at the lower end thereof on an annular member 96, which in turn is seated on a dished metal washer 97. The washer 97 is dished upwardly and rests on the elastomeric disc 73, but permits the latter to dish upwardly to vent vapors from the fuel tank 21 via the filler spout 60. The upper end of the pressure spring 95 is biased against the emergency relief pressure valve disc 72. A bell-shaped spring guide 98, the disc 72, and the cap portion 71 are fixed together by a centrally located round headed rivet 99, FIG. 6. When the pressure in the fuel tank 21 is great enough, the pressure spring 95 will be compressed and the assembly of the disc 73, the washer 97, and the member 96 will be lifted together as a unit.

The vacuum valve in the gas cap 70 comprises a small helical compression spring 100 with its lower end biased against a small hat-shaped bushing 102. The bushing 102 is carried by the washer 97 and is disposed about a valve stem 103, thus forming a valve guide. The upper end of the valve stem 103 is provided with an annular valve spring retainer shoulder 104. The spring 100 reacts against the shoulder 104 and biases a small dish-shaped vacuum valve 105 shut against the bottom side of the disc 73. Only when the fluid pressure in the chamber 76 exceeds the fluid pressure in the filler spout 60, thus creating a pressure differential or vacuum in the spout 60, will the vacuum valve 105 be biased downwardly for releasing pressure fluid from the chamber 76 into the filler spout 60 and the fuel tank 21. The pressure fluid flows along the vacuum valve stem 103 through the bushing 102 and peripherally of the vacuum valve 105 into the filler spout 60.

Figure 3:
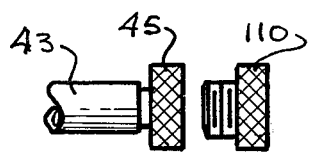
FIG. 3 is a side elevational view of a disconnected end of an air supply hose of FIGS. 1 and 2, and an end plug for plugging the end of the air supply hose when the same is disconnected from a spare tire and wheel assembly.

It must not be forgotten, FIG. 3, that the spare tire and wheel assembly 44 may be needed to serve its primary function as one of the running wheels of the vehicle 10 in an emergency. Whereupon, there being no other spare tire and wheel assembly available, the cap 45 at the end of the air line 43 must be disconnected from the tire valve stem 46, FIG. 2.

The use of the end plug 110 threaded into the cap 45 will prevent the escape of compressed air from the line 43 and keep the compressor 20 from being overloaded unnecessarily. It is understood that the compressor 20 is provided with pressure sensitive control means that shuts off the compressor 20 when the pressure in the discharge line 22 reaches a predetermined maximum pressure.

It will be understood that this invention can be modified to adapt it to various circumstances and conditions, and it is accordingly desired to comprehend within the purview of this invention such mofifications as amy be considered to fall within the scope of the appended claims.

What is claimed, is:

1. In a vehicle, engine means, liquid fuel tank means connected to said engine means for supplying liquid fuel thereto, accumulator means connected to said liquid fuel tank means, said accumulator means having pressure fluid means therein for forcing liquid fuel from said liquid fuel tank means to said engine means, compressor means connected to said accumulator means and said liquid fuel tank means for supplying pressure fluid thereto, emergency pressure fluid cylinder means connected to said fuel tank means, and two-way valve means connected in such a manner as to permit the flow of pressure fluid to said fuel tank means when the flow of pressure fluid from said compressor means and said accumulator means has been cut off.

2. In a vehicle as set forth in claim 1, wherein said accumulator means comprises spare tire and wheel assembly means.

3. In a vehicle as set forth in claim 1, pressure regulator means controlling the flow of pressure fluid to said fuel tank means.

4. In a vehicle as set forth in claim 1, valve means controlling the flow of pressure fluid to said fuel tank means.

5. In a vehicle as set forth in claim 1, solenoid-operated valve means operated by an engine ignition switch controlling the flow of pressure fluid to said fuel tank means and cutting off the flow of pressure fluid when said engine ignition switch has been turned off, and opening the flow of pressure fluid when said engine ignition switch has been turned on.

6. In a vehicle as set forth in claim 1, wherein said emergency pressure fluid cylinder means contains pressure fluid that supports the combustion of the liquid fuel with oxygen and does not suppress said combustion.

7. In a wheeled vehicle, engine means for propelling the vehicle, liquid fuel tank means connected to said engine means for supplying liquid fuel to the same, spare tire and wheel assembly means of the vehicle functioning as an accumulator, air compressor means driven by said engine means and supplying compressed air to said spare tire and wheel assembly means and to said liquid fuel tank means for forcing liquid fuel therefrom to said engine means, pressure regulator means controlling the flow of compressed air to said liquid fuel tank means, and solenoid-operated valve means operated by an engine ignition switch for shutting off the flow of compressed air to said liquid fuel tank means when said ignition switch is turned off, and for opening the flow of compressed air to said liquid fuel tank means when said ignition switch is turned on.

8. In a wheeled vehicle as set forth in claim 7, emergency cylinder means containing a pressure fluid connected to said liquid fuel tank means, and two-way valve means for disconnecting the flow of compressed air to said liquid fuel tank means, and for releasing the pressure fluid of said emergency cylinder means to said liquid fuel tank means when the flow of compressed air has been shut off by said two-way valve means.

9. In a wheeled vehicle as set forth in claim 8, gas cap means connected to said liquid fuel tank means, means venting liquid fuel vapor from said liquid fuel tank means through said gas cap means back to said engine means for consumption therein, and said gas cap means having vacuum valve means therein for relieving any vacuum in said liquid fuel tank means, and said gas cap means having pressure valve means therein for relieving the vapor pressure in said liquid fuel tank means.

* * * * *